April 5, 1927.
O. THIEME
1,623,217
TYPEWRITING MACHINE
Filed March 20, 1924
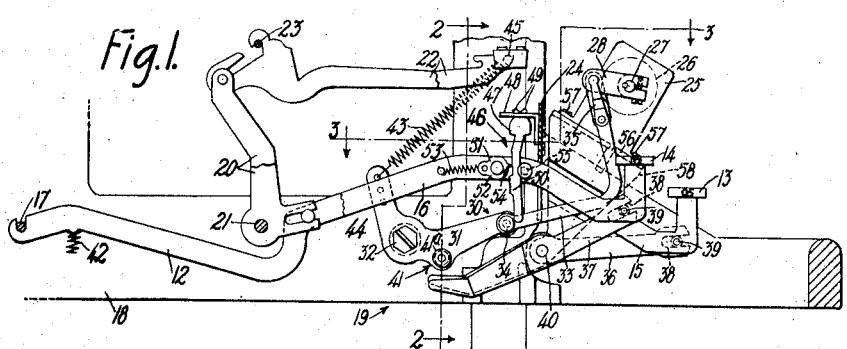
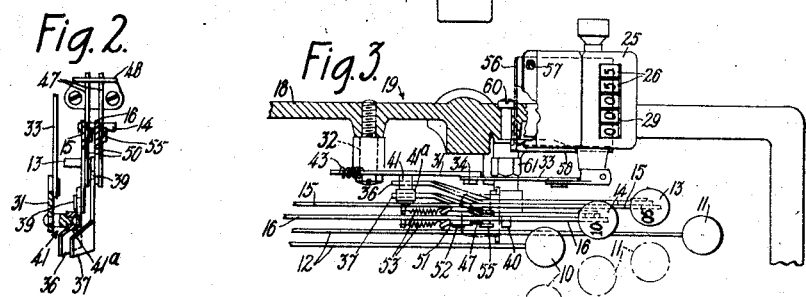
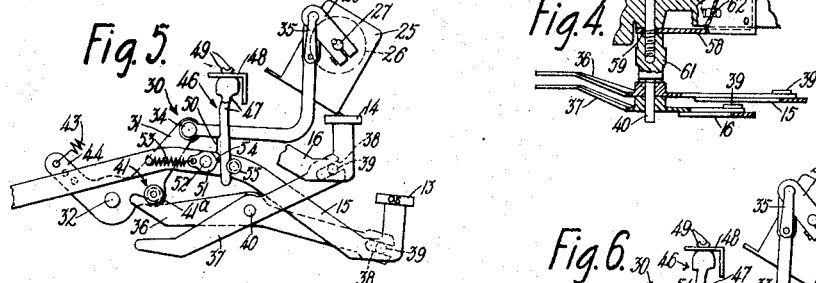
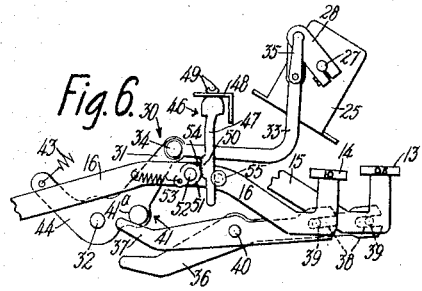
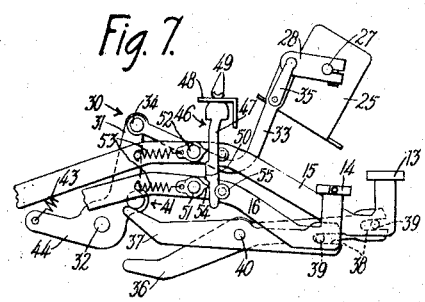
Inventor:
Otto Thieme
by B. C. Stickney
Attorney Patented Apr. 5, 1927.

1,623,217

UNITED STATES PATENT OFFICE.

OTTO THIEME, OF HARTFORD, CONNECTICUT, ASSIGNOR TO UNDERWOOD COMPUTING MACHINE COMPANY, OF NEW YORK, N. Y., A CORPORATION OF NEW YORK.

TYPEWRITING MACHINE.

Application filed March 20, 1924. Serial No. 700,455.

This invention relates to typewriting machines which are used in making out telephone bills and the like, and more particularly to means to actuate a counter or register for computing the tax or toll as it is typed on the bill by a 5 cent tax key or by a 10 cent tax key.

An object of the invention is to so construct and arrange the parts as to simplify their manufacture, and thus reduce their cost, and to minimize the use of screws and adjustments, so that the parts may readily and quickly be assembled to also economize in the cost of manual labor required in assembling.

Heretofore the tax counter has been operated by means of a toggle-joint, which is operable by either of the two tax keys; and a feature of the invention relates to an intermediate lever construction, to be operated by the tax keys, to operate such toggle-joint.

A further feature of the invention relates to improved mounting of the counter on the main frame.

The rack of the full-stroke mechanism does not descend, while the pawl, which is on the pivoted key-lever, descends in a curved path. The rack is formed upon a pendant which is hinged, in order to accommodate the rack to the curved path of motion of the pawl.

Other features and advantages will hereinafter appear.

In the accompanying drawings,

Figure 1 is a fragmentary sectional side view of a typewriting machine, showing the connection between the tax keys and the counter and the full-stroke devices associated with said keys, the parts being in their normal positions.

Figure 2 is a detail sectional rear view taken on the line 2—2 of Figure 1.

Figure 3 is a sectional top plan view taken on the line 3—3 of Figure 1.

Figure 4 is a sectional detail top plan view, showing how the counter bracket and the fulcrum for the intermediate counter-actuating levers are attached to the machine.

Figure 5 is a diagrammatic operating view, showing the 5 cent tax key depressed, and the shaft of the counter in its operated position, the dial-wheel of the counter having been rotated one space thereby.

Figure 6 is a view similar to Figure 5, but shows the 10 cent key partly depressed to effect one actuation of the dial-wheel.

Figure 7 is a view similar to Figure 6, but shows the 10 cent tax key completely depressed and the toggle-joint bent to the side opposite its normal position, to thus return the shaft of the counter to its normal position, preparatory to causing another oscillation of said shaft by the actuation of the toggle-joint upon the return stroke of the 10 cent tax key.

The invention is herein illustrated in connection with an Underwood typewriting machine, which may comprise the usual numeral-keys 10 and alphabet-keys 11 associated with key-levers 12, and also a special 5 cent tax key 13 and a 10 cent tax key 14 associated with key-levers 15 and 16, respectively. All of the key-levers are fulcrumed on a fulcrum rod 17 extending between the sides 18 of the main frame 19 of the machine. Each key-lever, when depressed, rocks a corresponding bell-crank 20 about its fulcrum 21 to swing a type-bar 22 upwardly and rearwardly about a pivot 23 to cause the type-bar to print against the cylindrical platen, not shown. The key-levers are guided at their forward ends by a guide-plate 24 having slots through which the key-levers extend.

The usual tax amounts to be recorded are five cents and ten cents, and these taxes are typed by the special tax keys, the associated type-bars of which have types bearing the numbers "05" and "10." Said keys are effective to actuate a counter 25 which may be similar to the well-known Veeder type, which comprises dial-wheels 26 mounted on a shaft 27, said shaft being provided with a crank-arm 28 by which it may be oscillated. The shaft 27 may be connected to actuate the dial-wheel of units position one space at a time, as shown in the application of Alfred G. F. Kurowski, Serial No. 599,221, filed November 6, 1922 (now Patent No. 1,574,906, dated March 2, 1926). The units dial-wheel is provided with numerals "0" and "5," alternately arranged on its face, the other dial-wheels having the regular arrangement of numerals from "1" to "0," inclusive. The construction of the units dial-wheel may be similar to that disclosed in the Kurowski application above referred to, and enables a carryover to the tens dial-wheel to be effected at every second space of said dial-wheel, or, in other words, every time a "5" moves away from the sight-opening 29 in the counter.

The actuating means for the counter may comprise a toggle-joint 30 composed of a lever 31 pivoted on a shouldered screw 32 threaded into the main frame of the machine, and a link 33 connected at one end to the lever 31 by a headed rivet 34, and at its other end to the crank-arm 28 of the counter by means of a snap connection 35. The toggle-joint is normally bent and occupies the position shown in Figure 1. It may be operated by either of two intermediate levers 36 and 37 associated with the tax keys 13 and 14, respectively. Each intermediate lever is provided at its forward end with a slot 38 to embrace a headed stud 39 on its associated key-lever to form a connection therewith, so that when either key-lever is depressed the associated intermediate lever is swung about a fulcrum pin 40 secured to the main frame, to raise its rear end, said rear end engaging with a lateral extension 41 on the lever 31 of the toggle-joint to swing said lever about its pivot to straighten out the toggle, as shown in Figure 5. Thus, the shaft 27 of the counter is rotated from the position shown in Figure 1, to the position shown in Figure 5, when the 5 cent tax key is operated to thus move the units dial-wheel through one position to add five to the amount already registered in the counter. Upon the release of the depressed key, the associated key-lever is returned to its normal position by the usual return spring 42, whereupon the toggle-joint is also restored to its normal position by a return spring 43, said spring being connected at one end to an arm 44 on the lever 31 of said toggle-joint, and at its other end to a pin 45 on the main frame of the machine. Thus, the shaft 27 of the counter, upon the return of the toggle-joint, is restored to normal position to complete the oscillation thereof.

It will be understood that the dip of the 5 cent tax key 13 is substantially equal to the dip of the 10 cent tax key 14, and, by an inspection of Figure 1, it will be seen that the length of the lever 36 from the fulcrum 40 to the point of connection with the associated tax key-lever 15 is greater than the corresponding part of the intermediate lever 37. Consequently, the 10 cent tax key, when depressed, moves the rear end of its associated lever 37 through a greater distance, to thus actuate the toggle-joint through a greater extent as compared with its actuation caused by the depression of the 5 cent tax key.

When the 10 cent tax key 14 is depressed, the toggle-joint 30 is first straightened out, as shown in Figure 6, by a partial depression of said 10 cent tax key. This moves the dial-wheel 26 through one space to thus add five to the amount in the counter. A further depression of the 10 cent tax key, to the position shown in Figure 7, causes the toggle-joint to be bent to the side opposite its normal position, causing the shaft 27 of the counter to be restored to its normal position, thus completing a single oscillation of said shaft. Upon the return stroke of the 10 cent tax key, from the position shown in Figure 7, the toggle-joint is again straightened out and then returned to its normal position shown in Figure 1. Thus the shaft of the counter is oscillated a second time to move the dial-wheel through another space to add another five to complete the ten which is run into the counter. From the foregoing, it will be understood that the actuation of the 10 cent tax key effects a two-space movement of the dial-wheel to add ten to the amount already in the counter, five being added upon the depression of said key, and five upon the return stroke of said key.

During the actuation of the 10 cent tax key 14, the lateral extension 41 on the lever 31 of the toggle-joint slides on the engaging surface of the intermediate lever 37, especially when said intermediate lever is moving from its partly-actuated position in Figure 6 to its fully-actuated position in Figure 7. This would ordinarily cause considerable friction due to rubbing, but, in order to reduce the friction to a minimum, the rubbing has been avoided by the provision of a roller 41ª suitably mounted on said lateral extension.

Full-stroke devices 46 are provided for the tax keys 13 and 14 to compel the completion of the stroke of each in either direction after it has been started, to thus insure against any possible malaction of the counter 25. Each full-stroke device comprises a pendant 47 pivotally supported at its upper end in a bracket 48 secured to the back of the key-lever guide-plate 24. To connect the pendants to said bracket, each is provided at its upper end with two prongs 49 which are normally close together, so that they may be passed through an opening in said bracket, after which the prongs may be separated by spreading them to thus retain the pendant pivotally on the bracket. Each pendant 47 is further provided with a toothed portion 50 in the path of a pawl 51 pivotally supported at 52 on the associated tax key-lever, the pawl being held in a central position by a coil spring 53. Each pawl is provided with a nose 54 which engages the toothed portion 50 of the associated pendant as the key-lever is depressed, thus swinging the pawl about its pivot, as indicated in Figure 6, to enable the key-lever to be depressed, but preventing its return to normal position before it has been completely depressed. Upon further depression of the key-lever, the pawl moves past the toothed portion 50 of the pendant, and thus swings to the position shown in Figure 7. In a similar manner the pawl 51, upon the return stroke of the tax key-lever, is swung about its pivot 52 against the tension of the spring 53 in the opposite direction to enable the pawl to slide over the teeth. In this way another depression of the tax key-lever is prevented before it is completely restored. This is of particular importance in connection with the 10 cent tax key 14, which, it will be remembered, moves the dial-wheel of the counter one space during its return movement.

To hold the full-stroke pendants 47 in proper cooperative relation with their pawls 51, each tax key-lever is provided with a headed stud 55 engaging on the side of the pendant opposite to which the pawl 51 is disposed. Thus, the body of the stud 55 holds the full-stroke pendant 47 in co-operative relation with the pawl 51, the head of said stud serving to prevent lateral displacement of said pendant relatively to said pawl. By an inspection of Figure 1, it will be seen that the key-levers are fulcrumed at 17, considerably below the full-stroke pawl 51. Consequently, each pawl, as it is carried downwardly by the associated tax key-lever, also moves slightly forward. This is one of the reasons for pivotally supporting the pendants 47, and preferably at their upper ends, so that each may swing slightly forward, due to the forward movement of said pawl, during the actuation of the associated key-lever, said pendant remaining, however, always in proper co-operative relation with the pawl, since it is constrained by the stud 55 on the key-lever.

The counter 25 is secured to a bracket 56 by suitable screws 57, said bracket having a downwardly-extending ear 58 with a hole 59 therein through which a screw 60 passes from the main frame 19 (Figure 4), said screw is threaded into a headed portion or nut 61 of the fulcrum pin 40 of the intermediate levers, to thus clamp said bracket in place on the main frame. To assist in holding said bracket in position, the main frame is provided with an aperture 63 into which an extension 62 of said bracket projects. Thus it will be understood that the screw 60 secures the counter 25 and the fulcrum pin 40 in place.

The intermediate counter-actuating levers 36 and 37 are held in position on their fulcrum pin 40, or, in other words, are prevented from sliding off said pin by their associated key-levers 15 and 16, which are located on those sides of said intermediate levers which are nearest the free end of the fulcrum pin.

It will be seen, by an inspection of Figure 1, that the counter 25 is arranged in front of the key-lever guide-plate 24 where it may be conveniently observed by the typist, and that the lever 31 of the toggle-joint 30 is located behind said guide-plate where it may be conveniently engaged by the intermediate levers 36 and 37. As a result of this arrangement, the link 33, which forms part of the toggle-joint, is bent or L-shaped, so as to extend under the guide-plate from the lever 31 and upwardly at the front of said guide-plate to the crank-arm 28 of the counter.

From the foregoing, it will readily be understood that the parts are comparatively few in number, and simple in construction, and that the use of screws and adjustments of parts have been reduced to a minimum, so that the parts may be easily and quickly assembled.

Variations may be resorted to within the scope of the invention, and portions of the improvements may be used without others.

Having thus described my invention, I claim:

1. The combination of a key-lever, a counter, actuating mechanism for said counter, said actuating mechanism comprising a toggle-joint, and an intermediate lever to be operated by said key-lever, said intermediate lever engaging the toggle-joint to actuate the latter to operate the counter.

2. The combination of two key-levers, a counter, a shaft in said counter, actuating mechanism for said counter, said actuating mechanism comprising a toggle-joint connected to said shaft to oscillate the latter, and two intermediate levers to operate said toggle-joint, each intermediate lever being associated with one of the key-levers to be operated thereby, one of said key-levers being effective through its associated intermediate lever and the toggle-joint to cause a single oscillation of the shaft, and the other key-lever being effective through its associated intermediate lever and the toggle-joint to cause a double oscillation of said shaft.

3. The combination of two key-levers, a counter, actuating mechanism for said counter, said actuating mechanism comprising a toggle-joint, and two intermediate levers to operate said toggle-joint, each intermediate lever being associated with one of the key-levers to be operated thereby, one of said key-levers being effective through its associated intermediate lever and the toggle-joint to cause a single actuation of said counter, and the other key-lever being effective through its associated intermediate lever and the toggle-joint to cause a double actuation of said counter, said toggle-joint comprising an element having a member with engaging surfaces in stepped relation to be engaged by the intermediate levers.

4. The combination of a key-lever, a counter, actuating mechanism for said counter, said actuating mechanism comprising a toggle-joint composed of means including a lever of the third order, and a lever of the first order to be actuated by said key-lever to engage the lever of the third order to operate said toggle-joint.

5. The combination of a key-lever, a fulcrum for said lever at its rear end, mechanism operable by said key-lever, a full-stroke element, a pawl pivoted on said key-lever to co-operate with said element, said pawl being so located on the key-lever with respect to the key-lever fulcrum that it is carried downwardly and forwardly by the key-lever, said full-stroke element being pivoted at one of its ends so that it may swing forwardly due to the forward movement of said pawl, and means on said key-lever to keep said full-stroke element in proper co-operative relation with said pawl.

6. The combination of a main frame, a key-lever, a fulcrum for said key-lever at its rear end and on said main frame; computing mechanism operable by said key-lever, a full-stroke pendant pivoted on said main frame, said pendant having a toothed portion, a spring-controlled pawl pivoted on said key-lever to co-operate with the toothed portion of said pendant, said pawl being so located on the key-lever with respect to the key-lever fulcrum that it is carried downwardly and forwardly by said key-lever, said full-stroke pendant being effective to swing forwardly due to the forward movement of said pawl, and a headed stud on said key-lever to keep pendant in proper co-operative relation with said pawl.

7. The combination of a key-lever, a counter, actuating mechanism for said counter, said actuating mechanism comprising a toggle-joint, an intermediate lever to be operated by said key-lever, said intermediate lever engaging the toggle-joint to actuate the latter to operate the counter, a fulcrum for said intermediate lever, said intermediate lever having a slot at one end, and a stud on the key-lever to engage in said slot to actuate said intermediate lever.

8. The combination of a key-lever, a counter, actuating mechanism for said counter, said actuating mechanism comprising a toggle-joint, an intermediate lever to be operated by said key-lever, said intermediate lever engaging the toggle-joint to actuate the latter to operate the counter, a main frame, and means pivoted on the frame to interlock with the key-lever to insure a full operative movement of the intermediate lever, to actuate the counter.

9. The combination with a typewriting machine comprising a main frame and key-levers, of a counter to be operated by said key-levers, a bracket to support said counter, means comprising a screw to secure said bracket to the main frame, the main frame having an aperture, and an extension on said bracket to engage in said aperture to assist in maintaining the counter in position on said main frame.

10. In a typewriting machine, the combination of a main frame, key-levers, a guide-plate for said key-levers near their forward ends, a counter arranged at the front of said guide-plate, means comprising a toggle-joint to actuate said counter, intermediate means operable by one of said key-levers to actuate said toggle-joint, said toggle-joint comprising a lever and a link, said lever being engaged by said intermediate means and being located behind said guide-plate, said link being connected to the link of the toggle-joint and to said counter and being bent to extend under the guide-plate and upwardly at the front thereof, and a return spring connected to the lever of the toggle-joint.

11. The combination of a counter, two key-levers, means comprising a toggle-joint to operate said counter, and two intermediate levers, one associated with each key-lever and operable thereby to actuate said toggle-joint through different extents according to the key operated to register different amounts in said counter.

12. The combination of a counter, two key-levers, means comprising an actuable element to operate said counter, and two intermediate levers, one associated with each key-lever, said intermediate levers having a common fulcrum and arms of different lengths engaged by said key-levers to operate the actuable element through different extents according to the key operated to register different amounts in said counter.

13. The combination of a counter, two key-levers, means including a lever of the third order to operate said counter, and two intermediate levers of the first order, one for each key-lever and operable by said key-levers to actuate the lever of the third order to operate said counter, the intermediate levers having arms of different lengths to effect the registering of different amounts in said counter.

OTTO THIEME.